United States Patent
Wu et al.

(10) Patent No.: US 12,489,509 B2
(45) Date of Patent: Dec. 2, 2025

(54) BEAM MANAGEMENT FOR A DEVICE IN AN INACTIVE MODE

(71) Applicant: NOKIA TECHNOLOGIES OY, Espoo (FI)

(72) Inventors: Chunli Wu, Beijing (CN); Samuli Heikki Turtinen, Ii (FI); Jussi-Pekka Koskinen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 239 days.

(21) Appl. No.: 18/260,518

(22) PCT Filed: Jan. 7, 2021

(86) PCT No.: PCT/CN2021/070711
§ 371 (c)(1),
(2) Date: Jul. 6, 2023

(87) PCT Pub. No.: WO2022/147728
PCT Pub. Date: Jul. 14, 2022

(65) Prior Publication Data
US 2024/0072871 A1    Feb. 29, 2024

(51) Int. Cl.
*H04B 7/06*     (2006.01)
*H04W 76/20*    (2018.01)

(52) U.S. Cl.
CPC ........ *H04B 7/06952* (2023.05); *H04W 76/20* (2018.02)

(58) Field of Classification Search
CPC .......... H04B 7/04; H04B 7/06; H04B 7/0686; H04B 7/0695; H04B 7/06952; H04W 76/20; H04W 76/27
See application file for complete search history.

(56) References Cited

U.S. PATENT DOCUMENTS

| 2018/0084585 A1 | 3/2018 | Lee et al. |
| 2018/0152232 A1 | 5/2018 | Cedergren et al. |

(Continued)

FOREIGN PATENT DOCUMENTS

| CN | 109391956 A | 2/2019 |
| CN | 110268791 A | 9/2019 |

(Continued)

OTHER PUBLICATIONS

Extended European Search Report for European Application No. 21916786.3 dated Aug. 30, 2024, 13 pages.

(Continued)

*Primary Examiner* — Paul H. Masur
(74) *Attorney, Agent, or Firm* — ALSTON & BIRD LLP

(57) ABSTRACT

Example embodiments of the present disclosure relate to transmit power control for beam management. The first device transmits a first configuration to a second device. The first configuration indicates information about at least one candidate beam assigned to the second device. Alternatively, or in addition, the first configuration further indicates a correspondence between the at least one candidate beam and a plurality of transmission occasions, where the plurality of transmission occasions are allocated by the first device for transmission from the second device to the first device while the second device is in an inactive mode. The first device detects transmissions from the second device according to the first configuration at the plurality of transmission occasions. Through this solution, a beam management solution and efficient resource configuration for a device in an inactive mode is proposed.

20 Claims, 9 Drawing Sheets

(56) References Cited

U.S. PATENT DOCUMENTS

| | | | |
|---|---|---|---|
| 2018/0167925 A1* | 6/2018 | Liu | H04W 76/28 |
| 2018/0368126 A1 | 12/2018 | Islam et al. | |
| 2019/0306909 A1 | 10/2019 | Zhou et al. | |
| 2019/0313456 A1 | 10/2019 | Liu et al. | |
| 2019/0350028 A1 | 11/2019 | Kaasalainen et al. | |
| 2020/0137602 A1 | 4/2020 | Zhang et al. | |
| 2021/0083751 A1 | 3/2021 | Chen et al. | |
| 2022/0116891 A1 | 4/2022 | Yao et al. | |
| 2022/0201659 A1* | 6/2022 | Agiwal | H04W 72/23 |
| 2022/0210798 A1* | 6/2022 | Tsai | H04W 72/1263 |
| 2022/0210860 A1* | 6/2022 | Chin | H04W 72/23 |
| 2022/0368406 A1 | 11/2022 | Kang et al. | |
| 2024/0064842 A1* | 2/2024 | Ye | H04W 52/0212 |

FOREIGN PATENT DOCUMENTS

| | | |
|---|---|---|
| CN | 110545580 A | 12/2019 |
| JP | 2018-523364 A | 8/2018 |
| JP | 2020-523852 A | 8/2020 |
| WO | 2018/071853 A1 | 4/2018 |
| WO | WO 2018/124026 A1 | 7/2018 |
| WO | WO 2018/171802 A1 | 9/2018 |
| WO | 2018/214052 A1 | 11/2018 |
| WO | WO 2019/029606 A1 | 2/2019 |
| WO | WO 2019/135654 A1 | 7/2019 |
| WO | 2019/193420 A1 | 10/2019 |
| WO | WO 2020/143761 A1 | 7/2020 |
| WO | WO 2020/164027 A1 | 8/2020 |
| WO | WO 2020/263049 A1 | 12/2020 |
| WO | WO 2021/203322 A1 | 10/2021 |
| WO | WO 2022/027429 A1 | 2/2022 |

OTHER PUBLICATIONS

Office Action for Chilean Application No. 202301973 dated Sep. 9, 2024, 26 pages.
Office Action for Australian Application No. 2021417629 dated Apr. 4, 2024, 3 pages.
Office Action for Algerian Application No. DZ/P/2023/1104 dated Feb. 20, 2024, 2 pages.
Office Action for Vietnamese Application No. 1-2023-04353 dated Mar. 22, 2024, 3 pages.
Huawei et al., "Discussion on CG-based scheme", 3GPP TSG-RAN WG2 #112-e, R2-2010281, (Nov. 2-13, 2020), 17 pages.
Office Action for Chinese Application No. 202180004503.4 dated Jun. 18, 2024, 12 pages.
Office Action for Japanese Application No. 2023-540844 dated Jun. 10, 2024, 9 pages.
Office Action for Saudi Arabian Application No. 523441509 dated Jun. 23, 2024, 6 pages.
"3rd Generation Partnership Project; Technical Specification Group Radio Access Network; NR; Medium Access Control (MAC) protocol specification (Release 16)", 3GPP TS 38.321 v16.2.1, (Sep. 2020), 154 pages.
"3rd Generation Partnership Project; Technical Specification Group Radio Access Network; NR; Physical channels and modulation (Release 16)", 3GPP TS 38.211 v16.3.0, (Sep. 2020), 133 pages.
"3rd Generation Partnership Project; Technical Specification Group Radio Access Network; NR; Physical layer procedures for control (Release 16)", 3GPP TS 38.213 v16.3.0, (Sep. 2020), 179 pages.
"3rd Generation Partnership Project; Technical Specification Group Radio Access Network; NR; Radio Resource Control (RRC) protocol specification (Release 16)", 3GPP TS 38.331 v16.2.0, (Sep. 2020), 926 pages.
ASUSTeK, "Association Between Pre-Configured PUSCH Resources and Beam", 3GPP TSG-RAN WG2 Meeting #112 Electronic, R2-2010432, (Nov. 2-13, 2020), 2 pages.

Catt, "Analysis on SDT Procedures Using CG", 3GPP TSG-RAN WG2 Meeting #112 electronic, R2-2009369, (Nov. 2-13, 2020), 5 pages.
Ericsson, "On Multiple PRACH Resource Type in NR", 3GPP TSG-RAN WG2 #98 AdHoc, Tdoc R2-1707129, (Jun. 27-29, 2017), 4 pages.
ETSI MCC, "Report of 3GPP TSG RAN2#112-e Meeting, Online" 3GPP TSG-RAN WG2 Meeting #113-e, R2-2100001, (Nov. 2-13, 2020), 370 pages.
Intel Corporation, "Remaining Issues on Beam Management",3GPP TSG RAN WG1 Meeting #94, R1-1808669, (Aug. 20-24, 2018), 17 pages.
InterDigital, "Beam Selection and Maintenance for CG-Based SDT", 3GPP RAN WG2 Meeting #112e, R2-2010108, (Nov. 2-13, 2020), 3 pages.
International Search Report and Written Opinion for Patent Cooperation Treaty Application No. PCT/CN2021/070711 dated Oct. 11, 2021, 3 pages.
Mediatek Inc., "CG-based SDT" 3GPP TSG-RAN WG2 #112-e, R2-2009057, (Nov. 2-13, 2020), 5 pages.
Moderators (AT&T, NTT Docomo), "Updated RAN1 UE Features List for Rel-16 LTE", 3GPP TSG RAN WG1 #103-e, RP-2009350, (Oct. 26-Nov. 13, 2020), 20 pages.
Qualcomm Incorporated, "Discussion on CG Based NR Small Data Transmission", 3GPP TSG-RAN WG2 Meeting #112e, R2-2010007, (Nov. 2-13, 2020), 5 pages.
Samsung, "Configured Grant Based Small Data Transmission", 3GPP TSG-RAN2 Meeting #112 Electronic, R2-2009094, (Nov. 2-13, 2020), 8 pages.
TSG RAN WG2, "LS on Physical Layer Aspects of Small Data Transmission", 3GPP TSG-RAN WG2 Meeting #112e, R2-2010841, (Nov. 2-13, 2020), 2 pages.
Vivo, "Discussion on Channel Structure for 2-Step RACH", 3GPP TSG RAN WG1 #97, R1-1906124, (May 13-17, 2019), 14 pages.
Vivo, "Supporting Small Data Transmission via CG Configuration", 3GPP TSG-RAN WG2 Meeting #112-electronic, R2-2008961, (Nov. 2-13, 2020), 4 pages.
ZTE Corporation et al., "Configured Grant Based Small Data Transmission", 3GPP TSG-RAN WG2 #112e, R2-2009192, (Nov. 2-13, 2019), 10 pages.
ZTE Corporation, "Work Item on NR Smalldata Transmissions in Inactive State", 3GPP TSG RAN Meeting #86, RP-193252, (Dec. 9-12, 2019), 5 pages.
ZTE, "[Draft] LS on Physical Layer Aspects of Small Data Transmission", 3GPP TSG-RAN WG2 Meeting #112e, Draft R2-2010840, (Nov. 2-13, 2020), 2 pages.
ZTE, "Enhancements on Multi-Beam Operation", 3GPP TSG RAN WG1 Meeting #96bis, R1-1904014, (Apr. 8-12, 2019), 17 pages.
Office Action for Canadian Application No. 3,204,275 dated Nov. 21, 2024, 4 pages.
Office Action for Japanese Application No. 2023-540844 dated Dec. 12, 2024, 8 pages.
Office Action for Chinese Application No. 202411208807.4 dated May 29, 2025, 11 pages.
Office Action for Chilean Application No. 202301973 dated Jan. 13, 2025, 20 pages.
Office Action for Chinese Application No. 202180004503.4 dated Feb. 18, 2025, 12 pages.
Decision to Grant for Chinese Application No. 202180004503.4 dated Jul. 4, 2025, 4 pages.
Office Action for ARIPO Application No. AP/P/2023/014981 dated Jul. 18, 2025, 4 pages.
Office Action for Korean Application No. 10-2023-7021767 dated Aug. 14, 2025, 13 pages.
Decision to Grant for ARIPO Application No. AP/P/2023/014981 dated Sep. 22, 2025, 5 pages.
Decision to Grant for Chilean Application No. 2023-01973 dated Aug. 5, 2025, 4 pages.
Examination Report for Indian Application No. 202327051946 dated Oct. 28, 2025, 5 pages.

* cited by examiner

| System Frame Index | 0 | | | | | | | | | | 1 | | | | | | | | | | 2 |
|---|---|---|---|---|---|---|---|---|---|---|---|---|---|---|---|---|---|---|---|---|---|
| Subframe Index | 0 | 1 | 2 | 3 | 4 | 5 | 6 | 7 | 8 | 9 | 0 | 1 | 2 | 3 | 4 | 5 | 6 | 7 | 8 | 9 | |
| Transmission occasion Index | 0 | | 1 | | 2 | | 3 | | 4 | | 5 | | 6 | | 7 | | 8 | | 9 | | |
| Candidate beam Index | 0 | | 1 | | 2 | | 0 | | 1 | | 2 | | 0 | | 1 | | 2 | | 0 | | |

Fig.3

| System Frame Index | 0 | | | | | | | | | | 1 | | | | | | | | | | 2 | | | | | | | | | |
|---|---|---|---|---|---|---|---|---|---|---|---|---|---|---|---|---|---|---|---|---|---|---|---|---|---|---|---|---|---|---|
| Subframe Index | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| Transmission occasion Index | 0 | | 1 | | 2 | | 3 | | 4 | | | 5 | | 6 | | 7 | | 8 | | 9 | | | | | | | | | | |
| Candidate beam Index | 2 3 | | 0 1 | | 2 3 | | 0 1 | | 2 3 | | | 0 1 | | 2 3 | | 0 1 | | 2 3 | | 0 1 | | | | | | | | | | |

BEAM MANAGEMENT FOR A DEVICE IN AN INACTIVE MODE

CROSS-REFERENCE TO RELATED APPLICATIONS

This application is a national phase entry of International Application No. PCT/CN2021/070711, filed Jan. 7, 2021, the contents of which are hereby incorporated by reference in their entirety.

FIELD

Embodiments of the present disclosure generally relate to the field of telecommunication and in particular, to methods, devices, apparatuses and computer readable storage medium for beam management for a device in an inactive mode.

BACKGROUND

To achieve resource utilization, many technologies have been proposed and applied in the wireless communication systems. For example, beam based transmission schemes can be used for directional wireless communication. More specifically, a network device and a terminal device exchange beaming information (such as, beam configuration information, measurement result, feedback, and the like) between each other to enable directional wireless communication.

In addition, power consumption of the terminal device is also a focus which should be considered in current wireless communication system. In order to reduce power consumption of the terminal device, it is proposed that the terminal device may be configured in some power saving modes (such as, inactive mode). As for a terminal device in an inactive mode, some unnecessary procedures (such as, a beam management procedure) are proposed to be suspended.

However, in some scenarios, a terminal device being in an inactive mode still needs to perform transmissions (such as, small data transmission (SDT)) with the network device, which causes that the beam management procedure for the terminal device being in an inactive mode is necessary. Therefore, it is desirable to propose and discuss the beam management solutions and efficient resource configuration for a device in an inactive mode.

SUMMARY

In general, example embodiments of the present disclosure provide a solution of beam management for a device in an inactive mode. Embodiments that do not fall under the scope of the claims, if any, are to be interpreted as examples useful for understanding various embodiments of the disclosure.

In a first aspect, there is provided a first device. The first device comprises at least one processor; and at least one memory including computer program code; where the at least one memory and the computer program code are configured to, with the at least one processor, cause the first device to transmit a first configuration to a second device. The first configuration indicates at least one of the following: information about at least one candidate beam assigned to the second device, or a correspondence between the at least one candidate beam and a plurality of transmission occasions, the plurality of transmission occasions allocated by the first device for transmission from the second device to the first device while the second device is in an inactive mode. The first device is further caused to detect, at the plurality of transmission occasions, transmissions from the second device according to the first configuration.

In a second aspect, there is provided a second device. The second device comprises at least one processor; and at least one memory including computer program code; where the at least one memory and the computer program code are configured to, with the at least one processor, cause the second device to receive a first configuration from a first device. The first configuration indicates at least one of the following: information about at least one candidate beam assigned to the second device, or a correspondence between the at least one candidate beam and a plurality of transmission occasions, the plurality of transmission occasions allocated by the first device for transmission from the second device to the first device while the second device is in an inactive mode. The second device is further caused to in accordance with a determination that the second device is in an inactive mode and there is transmission to be transmitted from the second device to the first device, determine a target transmission occasion from the transmission occasions according to the first configuration. The second device is also caused to perform, at the target transmission occasion, the transmission from the second device to the first device.

In a third aspect, there is provided a method. The method comprises transmitting, at a first device and to a second device, a first configuration, where the first configuration indicates at least one of the following: information about at least one candidate beam assigned to the second device, or a correspondence between the at least one candidate beam and a plurality of transmission occasions, the plurality of transmission occasions allocated by the first device for transmission from the second device to the first device while the second device is in an inactive mode. The method further comprises detecting, at the plurality of transmission occasions, transmissions from the second device according to the first configuration.

In a fourth aspect, there is provided a method. The method comprises receiving, at a second device and from a first device, a first configuration, where the first configuration indicates at least one of the following: information about at least one candidate beam assigned to the second device, or a correspondence between the at least one candidate beam and a plurality of transmission occasions, the plurality of transmission occasions allocated by the first device for transmission from the second device to the first device while the second device is in an inactive mode. The method further comprises in accordance with a determination that the second device is in an inactive mode and there is transmission to be transmitted from the second device to the first device, determine a target transmission occasion from the transmission occasions according to the first configuration. The method also comprises performing, at the target transmission occasion, the transmission from the second device to the first device.

In a fifth aspect, there is provided a first apparatus. The first apparatus comprises means for transmitting to a second apparatus, a first configuration, where the first configuration indicates at least one of the following: information about at least one candidate beam assigned to the second apparatus, or a correspondence between the at least one candidate beam and a plurality of transmission occasions, the plurality of transmission occasions allocated by the first apparatus for transmission from the second apparatus to the first apparatus while the second apparatus is in an inactive mode. The first apparatus further comprises means for detecting, at the plurality of transmission occasions, transmissions from the second apparatus according to the first configuration.

In a sixth aspect, there is provided a second apparatus. The second apparatus comprises means for receiving, from a first apparatus, a first configuration, where the first configuration indicates at least one of the following: information about at least one candidate beam assigned to the second apparatus, or a correspondence between the at least one candidate beam and a plurality of transmission occasions, the plurality of transmission occasions allocated by the first apparatus for transmission from the second apparatus to the first apparatus while the second apparatus is in an inactive mode. The second apparatus further comprises means for in accordance with a determination that the second apparatus is in an inactive mode and there is transmission to be transmitted from the second apparatus to the first apparatus, determine a target transmission occasion from the transmission occasions according to the first configuration. The second apparatus also comprises means for performing, at the target transmission occasion, the transmission from the second apparatus to the first apparatus.

In a seventh aspect, there is provided a computer readable medium. The computer readable medium comprises program instructions for causing an apparatus to perform at least the method according to the third aspect.

In an eighth aspect, there is provided a computer readable medium. The computer readable medium comprises program instructions for causing an apparatus to perform at least the method according to the fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 3 illustrates a block diagram of example beam configuration according to some example embodiments of the present disclosure;

FIG. 5 illustrates a block diagram of another example beam configuration according to some example embodiments of the present disclosure;

Throughout the drawings, the same or similar reference numerals represent the same or similar element.

DETAILED DESCRIPTION

Figure 1:
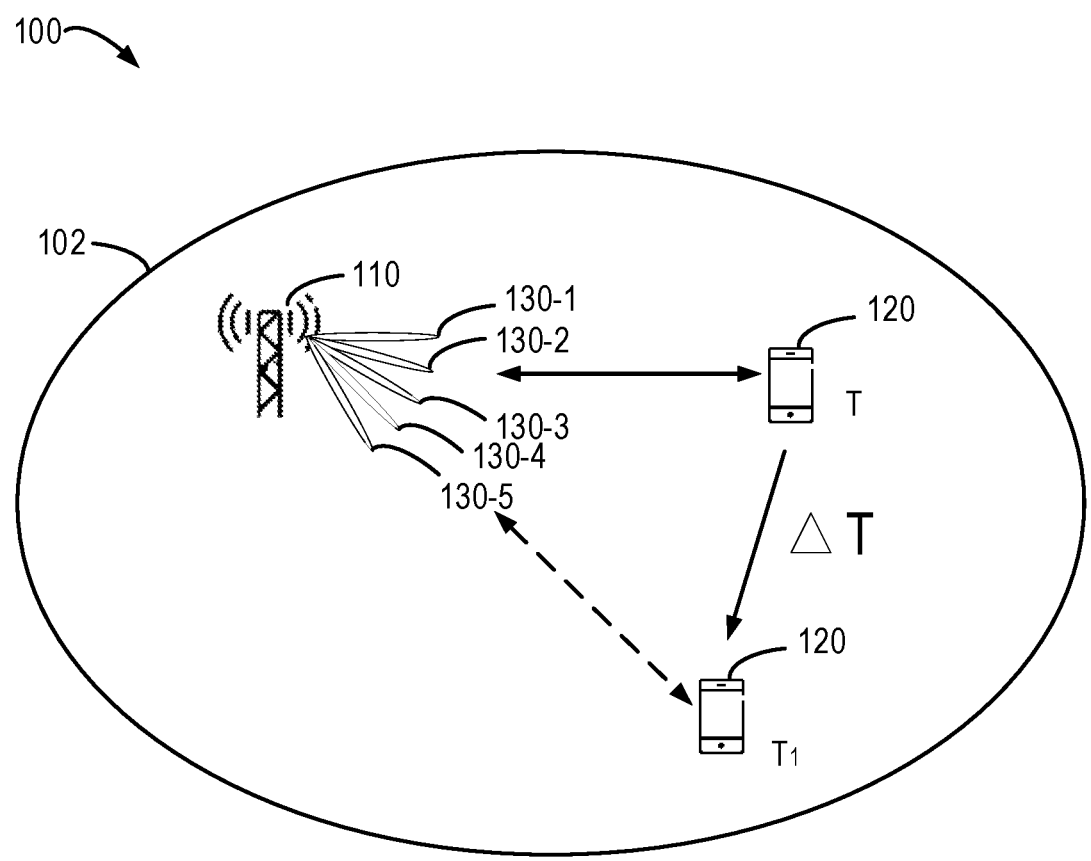
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As used herein, the term "resource," "transmission resource," "resource block," "physical resource block" (PRB), "uplink (UL) resource," or "downlink (DL) resource" may refer to any resource for performing a communication, for example, a communication between a terminal device and a network device, such as a resource in time domain, a resource in frequency domain, a resource in space domain, a resource in code domain, a resource in a combination of more than one domain or any other resource enabling a communication, and the like. In the following, a resource in time domain (such as, a subframe) will be used as an example of a transmission resource for describing some example embodiments of the present disclosure. It is noted that example embodiments of the present disclosure are equally applicable to other resources in other domains.

As discussed above, in order to reduce power consumption for the terminal device, the device (especially for the terminal device) may be configured in some power saving modes. For example, a Radio Resource Control (RRC) inactive mode has been proposed and defined by a work item of the third Generation Partnership Project (3GPP). Further, as discussed above, in some scenarios, a terminal device in an inactive mode still needs to perform transmissions with the network device. Another work item was conducted in the 3GPP for small data transmissions (SDT) for a terminal device in RRC inactive mode in New Radio (NR) during Release 17 (Rel-17). As a result, two possible solutions are proposed for enabling SDT for a terminal device in an inactive mode as will be discussed below.

One possible solution is performed by using random access channel (RACH) procedure including 2-step RACH and 4-step RACH (also referred to as RACH-based schemes). More specifically, SDT may be transmitted via message A of 2-step RACH and message 3 of 4-step RACH from the terminal device in an inactive mode to the network device. Further, in Rel-17, the size of the payload is more flexible than that in Rel-16.

Another possible solution is performed by pre-configuring resource (also referred to as configured grant (CG)-based schemes). More specifically, in case that timing advance (TA) is valid, SDT may be transmitted on pre-configured Physical Uplink Shared Channel (PUSCH) resources by reusing the configured grant type 1. In this way, the network device may pre-configured resources for the terminal device first, and then when the terminal device enters into the RRC inactive mode and needs to perform transmission with the network device, the terminal may transmit the data over the pre-configured resources.

In addition, some agreements are reached as following:
The configuration of configured grant resource for SDT transmitted by a terminal device in an inactive mode may be transmitted by the network device via a RRC release message.

The configuration of configured grant resource may include the configured grant configuration with type 1.

A new TA timer for TA maintenance specified for configured grant-based solution should be introduced. The newly introduced TA timer may be configured together with the configured grant configuration in the RRC release message.

The configuration of configured grant resource is valid only in current serving cell.

The terminal device in an inactive mode can perform a SDT transmission on the configured grant resource in case that the following criteria are fulfilled: (1) the size of the data to be transmitted is smaller than a data volume threshold; (2) configured grant resource is configured and valid; (3) TA is valid.

There are also some pending issues needed to be discussed and stipulated. For example, whether other messages rather than RRC release message can be used for configuring the configured grant resource, whether to support multiple configured grants or not, how to process to the newly introduced of TA timer, and the like.

As discussed above, beam based transmission schemes are proposed and used for directional wireless communication in the wireless communication system. So far, traditional beam management is performed for a terminal device in a connected mode, in which the terminal device can obtain the information of a serving beam in time by a beam management procedure.

However, as for a terminal device in an inactive mode, the beam management procedure has been suspended. However, in some cases, some terminal devices move with a rapid speed. In this event, the previous serving beam may not be valid any more. As a result, when the terminal device is in an inactive mode, the terminal device and the network device do not know which beam can be used for performing transmissions. Therefore, it is desirable to propose and discuss the beam management solutions and efficient resource configuration for a device in an inactive mode.

According to some example embodiments of the present disclosure, there is proposed a solution for beam management and efficient resource configuration for a device in an inactive mode.

In this solution, a first device (such as, a network device) may transmit a first configuration to the second device (such as, a terminal device). In particular, the first configuration may indicate information about at least one candidate beam assigned to the second device. Alternatively, or in addition, the first configuration indicate may also indicate a correspondence between the at least one candidate beam and a plurality of transmission occasions, where the plurality of transmission occasions are allocated by the first device for transmission from the second device to the first device while the second device is in an inactive mode. With the first configuration, when the second device enters into inactive mode and needs to transmit data to the first device, the second device may derive the candidate(s) beam and transmit the data thereby. In this way, a beam management solution for a device in an inactive mode is proposed, where the terminal device may derive information about the candidate beam(s) and the possibility of successful transmission is enhanced. In the meanwhile, the second device can perform transmissions with the first device without entering into a connected mode.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed IOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication environment 100 in which example embodiments of the present disclosure can be implemented. In the communication environment 100, a first device 110 can communicate with a second device 120 via physical communication channels or links. Further, the first device 110 may communicate with the second device 120 via different beams to enable a directional communication. In the example of FIG. 1, beams 130-1 to 130-5 are illustrated. For purpose of discussion, the beams 130-1 to 130-5 are collectively or individually referred to as beam 130. Further, the coverage provided by the first device 110 is referred to as cell 102 herein.

In the environment 100, if the first device 110 is a network device and the second device 120 is a terminal device, a link from the first device 110 to the second device 120 is referred to as a DL, while a link from the second device 120 to the first device 110 is referred to as an UL. In DL, the first device 110 is a TX device (or a transmitter) and the second device 120 is a RX device (or a receiver). In UP, the second device 120 is a transmitting (TX) device (or a transmitter) and the first device 110 is a receiving (RX) device (or a receiver). As a specific example, the first device 110 is a network device, the second device 120 is a terminal device served by the first device 110.

In addition, in the example of FIG. 1, the second device 120 may move over time. As illustrated in FIG. 1, the second device 120 locates at different positions at time point T and time point. Further, the second device 120 may be in different modes, such as, connected mode and inactive mode. As a specific example, at time point T, the second device 120 is in a connected mode, which means that the second device 120 may receive and transmit signaling and data normally. At time point T1, the second device 120 is in an inactive mode, which means that the second device 120 works in a power saving mode and some unnecessary procedures (such as, beam management procedure) are suspended.

The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

It is to be understood that the numbers their connections of first device, second device, beam and cell, and are only for the purpose of illustration without suggesting any limitations. The communication environment 100 may include any suitable first device, second device, beam and cell adapted for implementing embodiments of the present disclosure. Although not shown, it is to be understood that one or more additional first devices and second devices may be located in the respective cells 102. It would also be appreciated that in some examples, only the homogeneous network deployment or only the heterogeneous network deployment may be included in the environment 100.

It is to be understood that, in generally, there is a correspondence between a synchronization signal (SS)/physical broadcast channel (PBCH) block (SSB) and a beam. Therefore, the procedure for beam management also can be implemented by SSB management according to the above correspondence. As used herein, the terms "beam" and "SSB" are equivalent with each other. In the following, the example embodiments are discussed by using the term of "beam". It is to be understood that all the discussion about "beam" is equally applicable to the "SSB".

Example embodiments of the present disclosure will be described in detail below with reference to the accompanying drawings.

Figure 2:
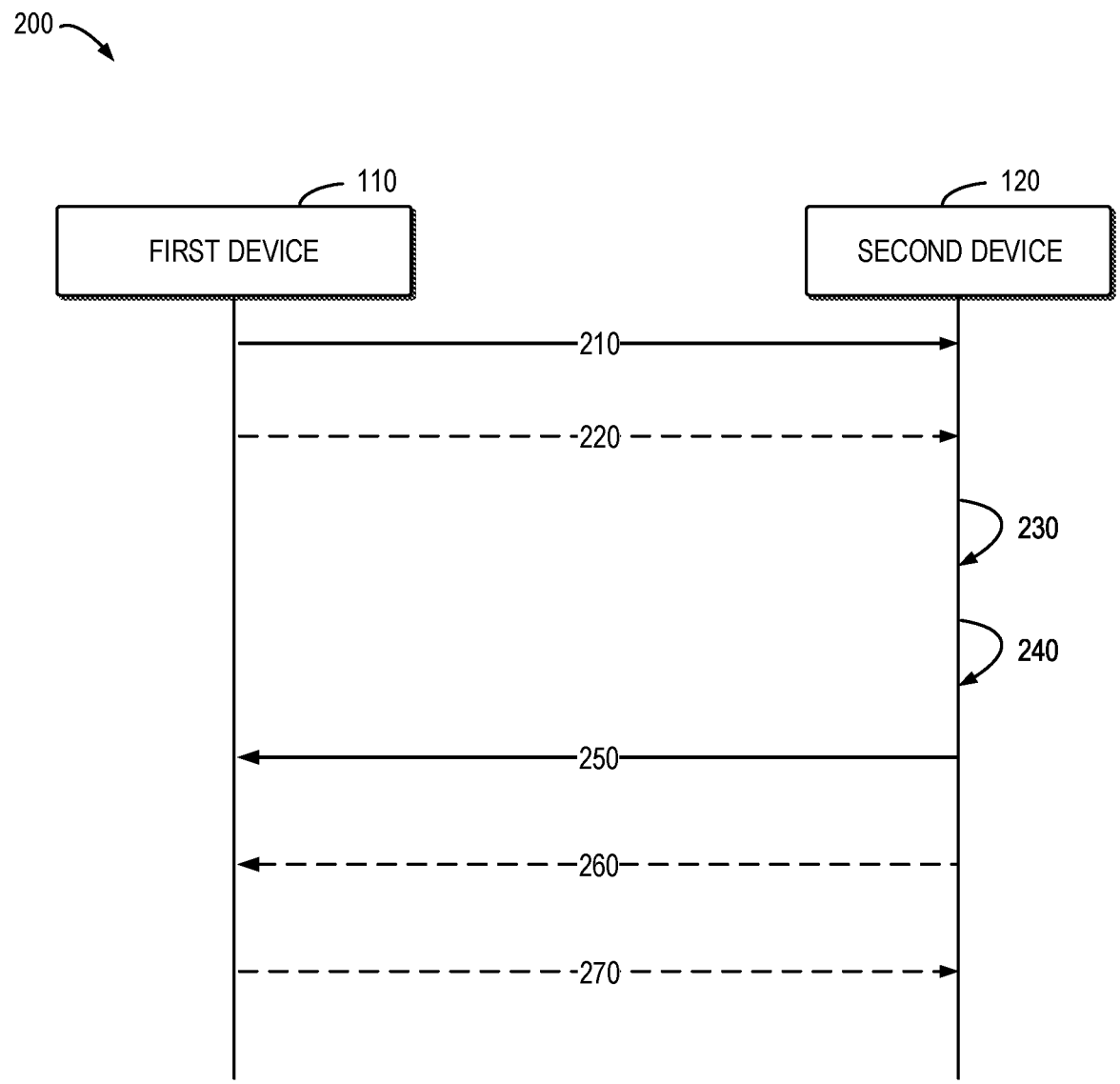
FIG. 2 illustrates a signaling flow for beam management according to some example embodiments of the present disclosure.

Reference is now made to FIG. 2, which shows a signaling flow 200 for beam management according to some example embodiments of the present disclosure. For the purpose of discussion, the signaling flow 200 will be described with reference to FIG. 1. The signaling flow 200 may involve a first device 110 and a second device 120. In the signaling flow 200, the first device 110 is a serving device (such as, a network device) of the second device 120 (such as, a terminal device) is a device served by the first device 110.

In the example of FIG. 2, the first device 110 and the second device support transmissions (such as, SDT from the second device 120 to the first device 110) by configured grant-based schemes. More specifically, the first device 110 may pre-configure resources (such as, PUSCH) for the second device 120, and then transmit message indicating the allocation of the pre-configured resources to the second device 120. In case that the second device 120 is in an inactive mode and needs to transmit data (such as, SDT) to the first device 110, the second device 120 may transmit the data over the pre-configured resource.

The first device 110 may indicate the pre-configured resources in any suitable manner, including explicitly or implicitly. As a specific example, the first device 110 may transmit a RRC signalling or other dedicated signalling message to the second device 120, which may include at least one configured grant (such, as configured grant Type 1).

As one example, the pre-configured resources may be periodical resources in time domain, which could be indicated by periodicity (represented to as "periodicity" hereafter) of the configured grant Type 1, and offset of a resource (represented as "timeDomainOffset" hereafter) with respect to a reference resource (such as, the system frame with index 0 in time domain).

Upon/in response to the configuration of a configured grant type 1 for a serving cell (for example, cell 102 as illustrated in FIG. 1) by upper layers, the medium access control Layer (MAC) entity may store the UL grant provided by upper layers as a configured UL grant, and initialize or re-initialize the configured UL grant to start in the symbol according to timeDomainOffset and to reoccur with periodicity.

In some example embodiments, after an uplink grant is configured for a configured grant Type 1, the MAC entity shall consider sequentially that the N$^{th}$ (N>=0) uplink grant occurs in the symbol (also referred to as "transmission occasion") for which:

[(*SFN*×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+*S*+*N*×periodicity)modulo(1024×numberOfSlotsPerFrame×numberOfSymbolsPerSlot). (1)

It would be appreciated that the above equation (1) for determining symbol/transmission occasion is provided for purpose of illustration. In other example embodiments, the symbol/transmission occasion may be determined in any other manners based on one or more of parameters for resource configuration and related factors provided in the example embodiments of the present disclosure.

According to the solution of the present disclosure, in addition to pre-configure resources for the second device 120, candidates beam(s) corresponding to the pre-configure resources are also assigned to the second device 120 as discussed in the following.

In operation, the first device 110 may transmit 210 a first configuration to the second device. The first configuration may be presented in any suitable manner, including explicitly or implicitly, such as, an indication, an information element, an embedded message, an embedded configuration, and the like. The first configuration may indicate the information about candidate beam(s) assigned to the second device 120. The candidate beam(s) can be used by the second device 120 while the second device is in an inactive mode.

Generally speaking, although the second device 120 moves over time, the movement range for the second device 120 within a duration is limited. As a result, the last serving beam and its neighboring beams have a relatively high possibility of being valid for the second device 120. In view of this, in some example embodiments, the candidate beam(s) comprise the last serving beam used by the second device 120. Alternatively, or in addition, the candidate beam(s) comprise at least one neighboring beam of the last serving beam.

In this way, candidate beam(s) to be used by the second device 120 in an inactive mode may be pre-assigned. Therefore, in case that the second device 120 is in an inactive mode, the candidate beam(s) can be known by both the first device 110 and second device 120, even there is not a normal beam management procedure.

In addition, the number of the candidate beam(s) should be configured reasonable. More specifically, if only one beam (such as, the last serving beam) is assigned for the second device 120, the possibility of determining an available beam would be relatively low. However, a relative lager number of candidate beam(s) means relatively low resource utilization, which is undesirable. In view of this, the number of the candidate beam(s) may be determined according to a trade-off between the possibility of determining an available beam and the resource utilization. For example, if the beam resource in the system are relatively sufficient, a relatively lager number of the candidate beam(s) may be assigned to the second device 120.

In addition, if the second device 120 moves with a relatively high speed, there is a relatively high possibility that the second device 120 moves out of the range covered by the last serving beam. In view of this, alternatively, or in addition, the number of the candidate beam(s) may be determined according to the speed of the second device 120. For example, if the second device 120 moves with a high speed, a relatively lager number of the candidate beam(s) may be assigned to the second device 120.

In this way, the possibility of determining an available beam is increased without allocating significant beam resources.

In some example embodiments, the first configuration may indicate the information about candidate beam(s) assigned to the second device 120 in any suitable manner, including explicitly or implicitly. For example, the first device 110 may indicates the number of the candidate beam(s) to the second device 120. Since the last serving beam is known to both the first device 110 and the second device 120, the first device 110 and the second device 120 may determine the candidate beam(s) based on the last serving beam and the number of the candidate beam(s). As a specific example, the index of the last serving beam is #5, and the number of the candidate beam(s) is 3, then the first device 110 and the second device 120 may determine the candidate beams to be beams #4, #5 and #6.

Alternatively, or in addition, the first configuration may indicate the respective indexes of the candidate beam(s). In this way, the second device 120 may be assigned with at least one candidate beam which can be used by the second device 120 when the second device 120 is in an inactive mode.

Alternatively, or in addition, the first configuration indicates a correspondence between the at least one candidate beam and a plurality of transmission occasions. The plurality of transmission occasions are allocated by the first device 110 for transmission from the second device 120 to the first device 110 while the second device 120 is in an inactive mode as discussed above. From the above correspondence, a relationship, a mapping, a correlation or an association between the at least one candidate beam and the plurality of transmission occasions may be derived. In the following, the term "correspondence" will be used only for the purpose of ease discussion. It is to be understood that the term "correspondence" can be replaced by any of terms "relationship", "mapping", "correlation", "association", and the like. In this way, the correspondence may be dynamically configured by the first device 110.

In some example embodiments, the correspondence between the at least one candidate beam and a plurality of transmission occasions indicates that different candidate beams are corresponding to different subsets of the plurality of transmission occasions. Additionally, in some example embodiments, the different candidate beams are corresponding to different subsets of the plurality of transmission occasions by time-division multiplexing.

Reference is now made to FIG. 3, which illustrated a block diagram of example beam configuration 300 according to some example embodiments of the present disclosure. As illustrated in FIG. 3, the first line represents the system frame index, the second line represents the subframe index, the third line represents the transmission occasion index, and the fourth line represents the candidate beam index. In the example of FIG. 3, ten transmission occasions (i.e., transmission occasions #0 to #9) and three candidate beams (i.e., candidate beams #0, #1 and #2) are assigned to the second device 120. Further, the candidate beam #0 is corresponding to first subset of transmission occasions including transmission occasions #0, #3, #6 and #9, the candidate beam #1 is corresponding to second subset of transmission occasions including transmission occasions #1, #4 and #9, and the candidate beam #2 is corresponding to third subset of transmission occasions including transmission occasions #2, #5 and #8.

It is to be understood that the numbers and their correspondence of system frame, subframe, transmission occasion and candidate beam shown FIG. 3 are only for the purpose of illustration without suggesting any limitations. Further, although the related resources are illustrated and discussed by example of system frame and subframe, it is to be understood that resource can any suitable types, such as, PRB, RB, symbol, and the like.

In addition, although the resources are illustrated as periodic resources, in some other example embodiments, the resource can be non-periodic resources, such as, some resources determined by a random selection procedure, or some resources determined by a pre-defined resource pattern, and the like.

In this way, the corresponding between the at least one candidate beam and the plurality of transmission occasions can be configured more flexibly. Especially, by using time-division multiplexing, the overhead for indicating the corresponding can be minimized. For example, once the second device 120 determined the candidate beams, the second device 120 may map the candidate beams to the transmission occasions according to a pre-defined rule. For example, the first device 110 maps the candidate beams to the transmission occasions sequentially and repeatedly.

As a specific example, both the candidate beams and the transmission occasions are re-numbered sequentially with an original value 0, and the correspondence between the candidate beam and the transmission occasion maybe represented as below:

$$\text{candidate beam index} = (N \bmod \text{number of candidate beams}) \quad (2)$$

Where parameter N represents the index of transmission occasion.

Additionally, in some example embodiments, a first candidate beam of the plurality of candidate beams is configured with a first periodicity, and a second candidate beam of the plurality of candidate beams is configured with a different second periodicity.

In some example embodiments, the periodicities of the candidate beams can be configured based on the possibility of the candidate beams to be available for the second device 120 while the second device 120 is in an inactive mode. For one example, the beams (especially, the last serving beam) that previously used by the second device 120 are configured with a relatively shorter periodicity. Additionally, in some example embodiments, the first configuration may further indicate respective periodicity of the candidate beams. In this way, the candidate beam(s) can be configured more reasonable.

Figure 4:
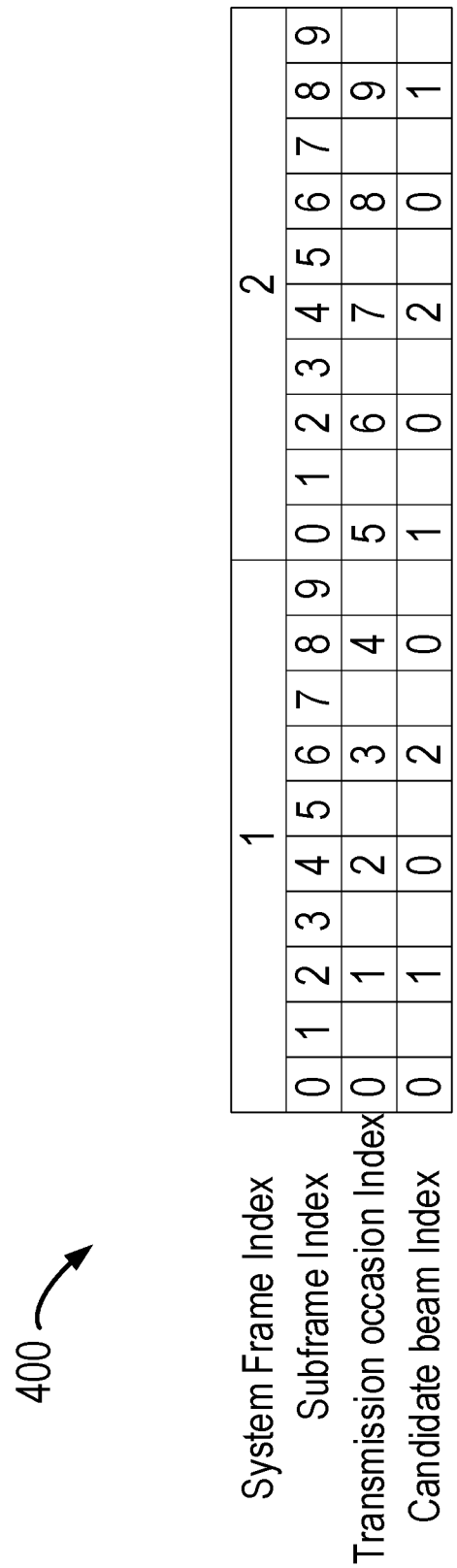
FIG. 4 illustrates a block diagram of further example beam configuration according to some example embodiments of the present disclosure.

Reference is now made to FIG. 4, which illustrated a block diagram of example beam configuration 400 according to some example embodiments of the present disclosure. Similar with the example of FIG. 3, in the example of FIG. 4, the first line represents the system frame index, the second line represents the subframe index, the third line represents the transmission occasion index, and the fourth line represents the candidate beam index. In the example of FIG. 4, ten transmission occasions (i.e., transmission occasions #0 to #9) and three candidate beams (i.e., candidate beams #0, #1 and #2) are assigned to the second device 120.

In the example of FIG. 4, the candidate beam #0 corresponds to the least serving beam, and is configured with a shorter periodicity than the other candidate beams. As illustrated in the FIG. 4, the candidate beam #0 is corresponding to first subset of transmission occasions including transmission occasions #0, #2, #4, #6 and #8, the candidate beam #1 is corresponding to second subset of transmission occasions including transmission occasions #1, #5 and #9, and the candidate beam #2 is corresponding to third subset of transmission occasions including transmission occasions #3 and #7.

It is to be understood that the numbers and their correspondence of system frame, subframe, transmission occasion and candidate beam shown FIG. 4 are only for the purpose of illustration without suggesting any limitations. Further, the periodicities of the candidate beams are only for the purpose of illustration without suggesting any limitations.

Alternatively, or in addition, in some example embodiments, the correspondence between the at least one candidate beam and a plurality of transmission occasions indicates that at least one of the transmission occasions is corresponding to more than one candidate beam.

Additionally, the number of candidate beams for each transmission occasion is the same.

In this way, the number of the candidate beams can be increased, and the possibility for determining available beam is enhanced accordingly.

Reference is now made to FIG. 5, which illustrated a block diagram of example beam configuration 500 according to some example embodiments of the present disclosure. Similar with the example of FIG. 3, in the example of FIG. 5, the first line represents the system frame index, the second line represents the subframe index, the third line represents the transmission occasion index, and the fourth line represents the candidate beam index. In the example of FIG. 5, ten transmission occasions (i.e., transmission occasions #0 to #9) and four candidate beams (i.e., candidate beams #0 to #4) are assigned to the second device 120.

In the example of FIG. 5, each transmission occasions are configured with more than one (such as, two) candidate beams. As illustrated in the FIG. 5, each of transmission occasions #0, #2, #4, #6 and #8 is configured with candidate beams #0 and #1, and each of transmission occasions #1, #3, #5, #7 and #9 is configured with candidate beams #2 and #3.

It is to be understood that the numbers and their correspondence of system frame, subframe, transmission occasion and candidate beam as shown FIG. 5 are only for the purpose of illustration without suggesting any limitations. Further, the periodicities of the candidate are only for the purpose of illustration without suggesting any limitations.

It is to be understand that the above example correspondence between the at least one candidate beam and a plurality of transmission occasions are only for the purpose of illustration without suggesting any limitations. The correspondence may be implemented in any suitable relationship. In some other example embodiments, different transmission occasions may be configured with different numbers of the candidate beams. Further, part of the candidate beams may be configured periodically and the others may be configured non-periodically. It is also be understand that the correspondence may be represented by any suitable parameters, such as, offset, index, periodicity, and so on.

After the discussion about the correspondence between the at least one candidate beam and a plurality of transmission occasions, reference is made back to FIG. 2.

In some example embodiments, the first configuration is transmitted via a RRC message, such as, RRC message release message. In this way, the first device 110 may instruct the second device 120 to enter into inactive mode and indicates the resource configuration (including the re-configured resources and the candidate beams) for transmissions from the second device 120 to the first device 110 while the second device 120 is in an inactive mode at the same time.

Alternatively, in some other example embodiments, the first configuration is transmitted via a system broadcast information signaling, such as, system broadcast information signaling. In this way, the first device 110 may updated the first configuration dynamically.

In some other example embodiments, the first device 110 may transmit the information for beam management via a plurality of configured grants. More specifically, in addition to transmitting the first configuration, the first device 110 also transmits 220 a second configuration to the second device 120. The second configuration indicates information about at least one further candidate beam assigned to the second device 120. Alternatively, or in addition, the second configuration further indicates a further correspondence between at least one further candidate beam and the plurality of transmission occasions. Additionally, different configured grants may be transmitted via one single message, or via different messages with different types and at different time points. In this way, the beam management procedure may be performed by the first device 110 more flexibly.

After transmitting the first configuration and the additional indications of the further configurations (such as, a second configuration), the first device 110 detects transmissions from the second device 120 at the plurality of transmission occasions.

After receiving the first configuration and the additional indications of the further configurations (such as, a second configuration) from the first device 110, the second device 120 may derive the candidate beam(s) assigned to the second device 120, and also can determine the correspondence between the candidate beam(s) and a plurality of transmission occasions.

If the second device 120 is in an inactive mode and then the second device 120 determines 230 that there is data needed to be transmitted to the first device 110, the second device 120 determines 240 a target transmission occasion from the plurality of transmission occasions which are configured and indicated by the first device 110. The determination for the target transmission is made based on the first configuration.

In some example embodiments, the second device 120 determines the target transmission occasion based on received signal strength of the at least one candidate beam. Alternatively, or in addition, the second device 120 determines the target transmission occasion based on time differences between the current time point and transmission time points corresponding to the transmission occasions. For example, the second device 120 determines whether the received signal strength of the candidate beam may support an acceptable transmission from the second device 120 to the first device 110, which can be performed by comparing the received signal strength of the candidate beam(s) with a pre-configured threshold. If there is only one beam that can support an acceptable transmission, the second device 120 may determine the next transmission occasion corresponding the determined beam that supports an acceptable transmission as the target transmission occasion. If the second device 120 determines that there are two or more beams that can support an acceptable transmission, the second device 120 may determine the transmission occasion corresponding to the beam with the best received signal strength as the target transmission occasion. Alternatively, the second device 120 may determine the next transmission occasion corresponding any of the beams that supports an acceptable UL transmission as the target transmission occasion. In some examples, for subsequent UL transmissions or any transmission subsequent to the first UL transmission, the second device 120 may use the transmission occasions corresponding to the selected beam of the first UL transmission. Alternatively, in one example, the second device 120 may use the transmission occasions corresponding to any beam with received signal strength above the pre-configured threshold.

It is to be understood that the above criteria for determining the target transmission occasions are only for the purpose of illustration without suggesting any limitations without suggesting any limitations. In some other example embodiments, any suitable other criteria may be applied for determining the target transmission occasion.

By this way, even the second device 120 is in an inactive mode, the second device 120 may determine a suitable beam for performing the transmission to the first device 110.

In some example embodiments, the second device 120 performs 250 the transmission from the second device 120 to the first device 110 at the determined target transmission occasion. As discussed above, the after transmitting the first configuration and an additional second configuration, the first device 110 detects transmissions from the second device 120 at the plurality of transmission occasions. Therefore, the transmission from the second device 120 may be detected and received by the first device 110 accurately.

In this way, by re-configuring candidate beam(s) for the second device 120, the possibility of successful UL transmission is increased.

Additionally, as discussed above, in some cases, one transmission occasion may be configured with more than one candidate beam. If the second device 120 determines that the target transmission occasion corresponds to more than one candidate beam, the second device 120 transmits 260 an indication of the target beam to the first device 110 and the first device 110 may detect the indication of the target beam accordingly. In this way, the first device 110 may be informed with the preferred beam for the second device 120.

In some example embodiments, the first device 110 may performs 270 a subsequent transmission based on the target beam indicated by the second device 120. For example, if the first device 110 has a data transmission to the second device 120, the first device 110 may performs the data transmission by using the target beam. As another example, the first device 110 may re-configure further candidate beam(s) for the second device 120 based on the target beam, and the information about the re-configured further candidate beam(s) may be updated to the second device 120.

In this way, the information about the optimal candidate beam(s) may be exchanged between the first device 110 and the second device 120 in time.

Through the present disclosure, a beam management solution for a device in an inactive mode is proposed, where the terminal device may derive information about the available beam and the possibility of successful transmission is enhanced. In the meanwhile, the second device 120 in an inactive mode can perform transmissions with the first device 110 without entering into a connected mode.

Figure 6:
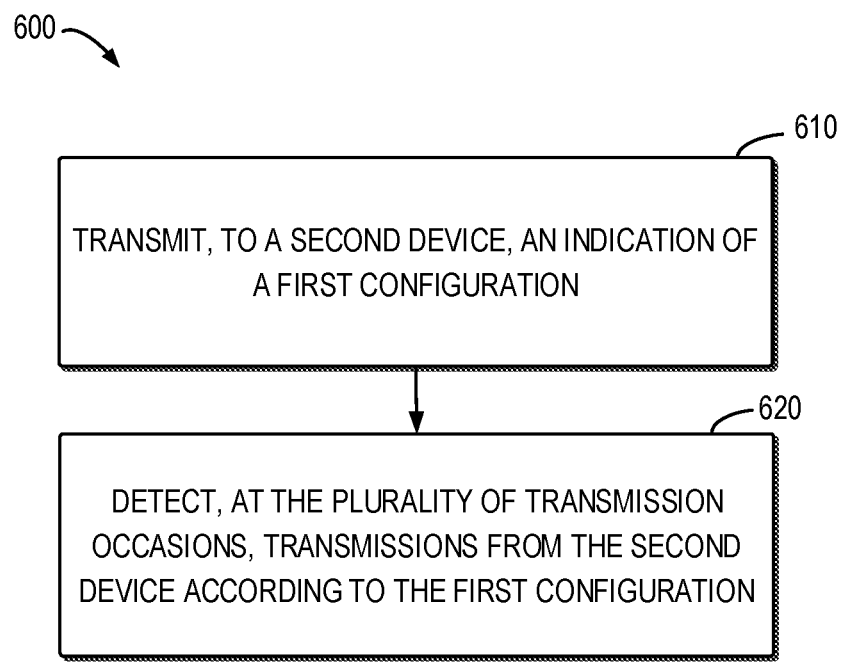
FIG. 6 illustrates a flowchart of a method implemented at a first apparatus according to some example embodiments of the present disclosure.

FIG. 6 shows a flowchart of an example method 600 implemented at a first device 110 in accordance with some example embodiments of the present disclosure. For the purpose of discussion, the method 600 will be described from the perspective of the first device 110 with respect to FIG. 1 and FIG. 2.

At block 610, a first device 110 transmits a first configuration to a second device 120. The first configuration indicates information about at least one candidate beam assigned to the second device 120. Alternatively, or in addition, the first configuration further indicates a correspondence between the at least one candidate beam and a plurality of transmission occasions, where the plurality of transmission occasions are allocated by the first device 110 for transmission from the second device 120 to the first device 110 while the second device 120 is in an inactive mode.

At block 620, the first device 110 detects transmissions from the second device 120 according to the first configuration at the plurality of transmission occasions.

In some example embodiments, the correspondence between the at least one candidate beam and a plurality of transmission occasions indicates one of the following: different candidate beams are corresponding to different subsets of the plurality of transmission occasions, or at least one of the transmission occasions is corresponding to more than one candidate beam.

In some example embodiments, the transmission occasions are periodic resources; and the first configuration further indicates respective periodicity of the at least one candidate beam.

In some example embodiments, a first candidate beam of the plurality of candidate beams is configured with a first periodicity, and a second candidate beam of the plurality of candidate beams is configured with a different second periodicity.

In some example embodiments, the first device 110 to detect an indication of a target beam which is determined by the second device 120 from the more than one candidate beam at a transmission occasion of the plurality of transmission occasions that corresponds to more than one candidate beam.

In some example embodiments, the at least one candidate beam comprises at least one of the following: a last serving beam used by the second device 120, or at least one neighboring beam of the last serving beam.

In some example embodiments, the first device 110 transmits a second configuration indicating a further correspondence between at least one further candidate beam and the plurality of transmission occasions to the second device 120.

In some example embodiments, the first configuration is transmitted via one of the following: a radio resource control release message, or a system broadcast information signaling.

In some example embodiments, the first device 110 is a network device, and the second device 120 is a terminal device.

Figure 7:
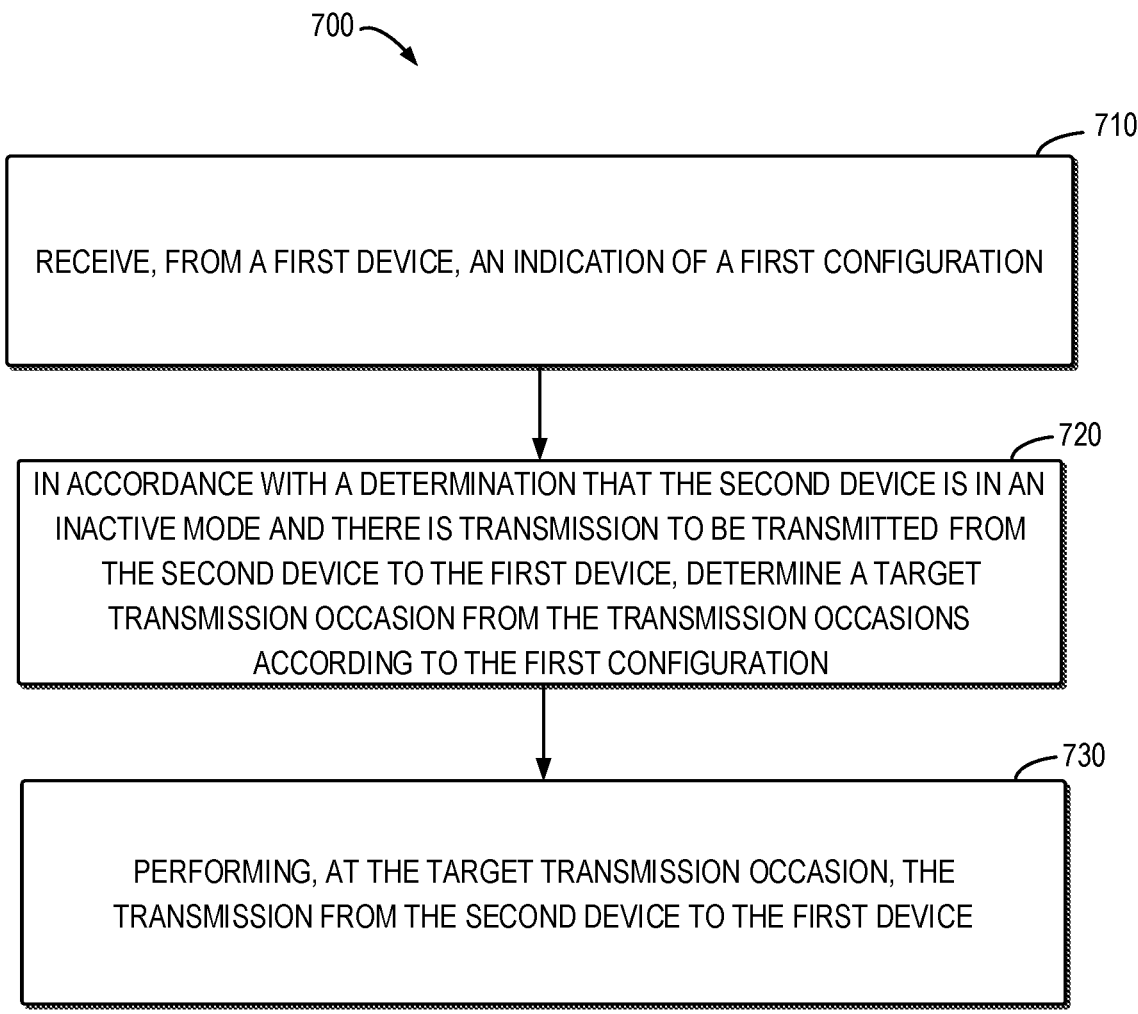
FIG. 7 illustrates a flowchart of a method implemented at a second apparatus according to some other example embodiments of the present disclosure.

FIG. 7 shows a flowchart of an example method 700 implemented at a second device 120 in accordance with some example embodiments of the present disclosure. For the purpose of discussion, the method 700 will be described from the perspective of the second device 120 with respect to FIG. 1 and FIG. 2.

At block 710, a second device 120 receives a first configuration from a first device 110. The first configuration indicates information about at least one candidate beam assigned to the second device 120. Alternatively, or in addition, the first configuration further indicates a correspondence between the at least one candidate beam and a plurality of transmission occasions, where the plurality of transmission occasions are allocated by the first device 110 for transmission from the second device 120 to the first device 110 while the second device 120 is in an inactive mode.

At block 720, the second device 120 in accordance with a determination that the second device 120 is in an inactive mode and there is transmission to be transmitted from the second device 120 to the first device 110, determines a target transmission occasion from the transmission occasions according to the first configuration.

At block 730, the second 120 performs at the target transmission occasion, the transmission from the second device 120 to the first device 110.

In some example embodiments, the correspondence between the at least one candidate beam and a plurality of transmission occasions indicates one of the following: different candidate beams are corresponding to different subsets of the plurality of transmission occasions, or at least one of the transmission occasions is corresponding to more than one candidate beam.

In some example embodiments, the transmission occasions are periodic resources; and the first configuration further indicates respective periodicity of the at least one candidate beam.

In some example embodiments, a first candidate beam of the plurality of candidate beams is configured with a first periodicity, and a second candidate beam of the plurality of candidate beams is configured with a different second periodicity.

In some example embodiments, the second device 120 determines the target transmission occasion based on at least one of the following: received signal strength of the at least one candidate beam, or time differences between the current time point and transmission time points corresponding to the transmission occasions.

In some example embodiments, the second device 120 determines one of the following as the target transmission occasion: a transmission occasion corresponding to a candidate beam of the at least one candidate beam with the best received signal strength, or a next transmission occasion corresponding to a candidate beam of the at least one candidate beam that supports an acceptable transmission from the second device 120 to the first device 110.

In some example embodiments, the second device 120 according to a determination that the target transmission occasion corresponds to more than one candidate beam, determines a target beam from the more than one candidate beam. Additionally, the second device 120 transmits an indication of the target beam to the first device 110.

In some example embodiments, the at least one candidate beam comprises at least one of the following: a last serving beam used by the second device 120, or at least one neighboring beam of the last serving beam.

In some example embodiments, the second device 120 receives, from the first device 110, a second configuration indicating a further correspondence between at least one further candidate beam and the plurality of transmission occasions In some example embodiments, the first configuration is transmitted via one of the following: a radio resource control release message, or a system broadcast information signaling.

In some example embodiments, the first device 110 is a network device, and the second device 120 is a terminal device.

Figure 8:
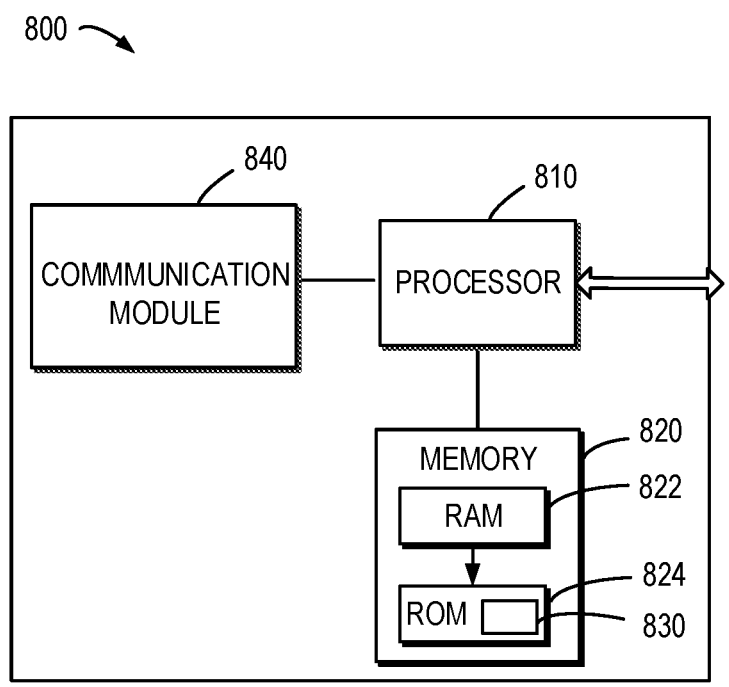
FIG. 8 illustrates a simplified block diagram of an apparatus that is suitable for implementing example embodiments of the present disclosure.

FIG. 8 is a simplified block diagram of a device 800 that is suitable for implementing example embodiments of the present disclosure. The device 800 may be provided to implement a communication device, for example, the first device 110 and the second device 120 as shown in FIG. 1. As shown, the device 800 includes one or more processors 810, one or more memories 820 coupled to the processor 810, and one or more communication modules 840 coupled to the processor 810.

The communication module 840 is for bidirectional communications. The communication module 840 has one or more communication interfaces to facilitate communication with one or more other modules or devices. The communication interfaces may represent any interface that is necessary for communication with other network elements. In some example embodiments, the communication module 840 may include at least one antenna.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The program 830 may be stored in the memory, e.g., ROM 824. The processor 810 may perform any suitable actions and processing by loading the program 830 into the RAM 822.

The example embodiments of the present disclosure may be implemented by means of the program 830 so that the device 800 may perform any process of the disclosure as discussed with reference to FIGS. 2, 6 and 7. The example embodiments of the present disclosure may also be implemented by hardware or by a combination of software and hardware.

Figure 9:
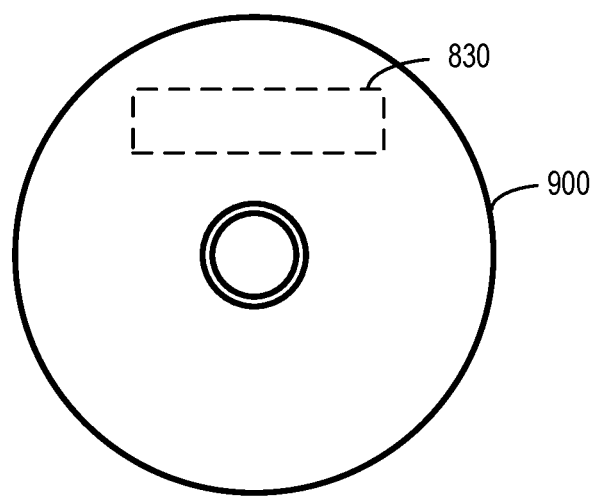
FIG. 9 illustrates a block diagram of an example computer readable medium in accordance with some example embodiments of the present disclosure.

In some example embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and the like. FIG. 9 shows an example of the computer readable medium 900 which may be in form of CD, DVD or other optical storage disk. The computer readable medium has the program 830 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 3 to 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
   at least one processor; and
   at least one memory including computer program code;
   wherein the at least one memory and the computer program code are configured to, with the at least one processor, cause the first device to:
   transmit, to a second device, a message indicating an allocation of pre-configured physical uplink shared channel (PUSCH) resources in accordance with a configured grant-based scheme, the PUSCH resources allocated by the first device for transmission from the second device to the first device while the second device is in an inactive mode;
   transmit, to the second device, a first configuration indicating:
     information about candidate beams assigned to the second device, and
     a correspondence between the candidate beams and a plurality of transmission occasions of the pre-configured PUSCH resources; and
   detect, at one of the plurality of transmission occasions that corresponds to more than one candidate beam, a transmission from the second device according to the first configuration and an indication of a target beam which is determined by the second device from the more than one candidate beam.

2. The first device of claim 1, wherein the correspondence between the candidate beams and a plurality of transmission occasions indicates that
   different candidate beams are corresponding to different subsets of the plurality of transmission occasions.

3. The first device of claim 1, wherein the transmission occasions are periodic resources; and
   wherein the first configuration further indicates respective periodicity of the candidate beams.

4. The first device of claim 1, wherein a first candidate beam of the candidate beams is configured with a first periodicity, and a second candidate beam of the candidate beams is configured with a different second periodicity.

5. The first device of claim 1, wherein the first configuration is transmitted within a radio resource control (RRC) message instructing the second device to enter into the inactive mode, and the inactive mode is an RRC inactive mode.

6. The first device of claim 1, wherein the first configuration indicates respective indexes of the candidate beams assigned to the second device.

7. A second device comprising:
   at least one processor; and
   at least one memory including computer program code;
   wherein the at least one memory and the computer program code are configured to, with the at least one processor, cause the second device to:
   receive, from a first device, a message indicating an allocation of pre-configured physical uplink shared channel (PUSCH) resources in accordance with a configured grant-based scheme, the PUSCH resources allocated by the first device for transmission from the second device to the first device while the second device is in an inactive mode;

receive, from the first device, a first configuration indicating:
information about candidate beams assigned to the second device, and
a correspondence between the candidate beams and a plurality of transmission occasions of the pre-configured PUSCH resources; and in accordance with a determination that the second device is in the inactive mode and there is transmission to be transmitted from the second device to the first device:
determine a target transmission occasion from the transmission occasions according to the first configuration, the target transmission occasion corresponding to more than one candidate beam;
perform, at the target transmission occasion, the transmission from the second device to the first device; and
transmit at the target transmission occasion an indication of a target beam selected from the more than one candidate beam.

8. The second device of claim 7, wherein the correspondence between the candidate beams and a plurality of transmission occasions indicates that
different candidate beams are corresponding to different subsets of the plurality of transmission occasions.

9. The second device of claim 7, wherein the transmission occasions are periodic resources; and
wherein the first configuration further indicates respective periodicity of the candidate beams.

10. The second device of claim 9, wherein a first candidate beam of the candidate beams is configured with a first periodicity, and a second candidate beam of the candidate beams is configured with a different second periodicity.

11. The second device of claim 7, wherein the at least one memory and the computer program code are configured to, with the at least one processor, further cause the second device to determine the target transmission occasion by:
determining the target transmission occasion based on at least one of the following:
received signal strength of the candidate beams, or
time differences between the current time point and transmission time points corresponding to the transmission occasions.

12. The second device of claim 7, wherein the at least one memory and the computer program code are configured to, with the at least one processor, further cause the second device to determine the target transmission occasion by:
determining one of the following as the target transmission occasion:
a transmission occasion corresponding to a candidate beam of the candidate beams with the best received signal strength, or
a next transmission occasion corresponding to a candidate beam of the candidate beams that supports an acceptable transmission from the second device to the first device.

13. The second device of claim 7, wherein the at least one memory and the computer program code are configured to, with the at least one processor, further cause the second device to perform a subsequent transmission using a transmission occasion corresponding to the target beam.

14. The second device of claim 7, wherein the first configuration is transmitted within a radio resource control, RRC, message instructing the second device to enter into the inactive mode, and the inactive mode is a RRC inactive mode.

15. The second device of claim 7, wherein the first configuration indicates respective indexes of the candidate beams assigned to the second device.

16. The second device of claim 7, wherein the determining the target transmission occasion is based on the selected target beam.

17. A method, comprising:
transmitting, at a first device and to a second device, a message indicating an allocation of pre-configured physical uplink shared channel (PUSCH) resources in accordance with a configured grant-based scheme, the PUSCH resources allocated by the first device for transmission from the second device to the first device while the second device is in an inactive mode;
transmitting, at the first device and to the second device, a first configuration indicating:
information about candidate beams assigned to the second device, and
a correspondence between the candidate beams and a plurality of transmission occasions of the pre-configured PUSCH resources; and
detecting, at one of the plurality of transmission occasions that corresponds to more than one candidate beam, a transmission from the second device according to the first configuration and an indication of a target beam which is determined by the second device from the more than one candidate beam.

18. The method of claim 17, wherein the correspondence between the candidate beams and the plurality of transmission occasions indicates that
different candidate beams are corresponding to different subsets of the plurality of transmission occasions.

19. A method, comprising:
receiving, at a second device and from a first device, a message indicating an allocation of pre-configured physical uplink shared channel (PUSCH) resources in accordance with a configured grant-based scheme, the PUSCH resources allocated by the first device for transmission from the second device to the first device while the second device is in an inactive mode;
receiving, at the second device and from the first device, a first configuration indicating:
information about candidate beams assigned to the second device, and
a correspondence between the candidate beams and a plurality of transmission occasions of the pre-configured PUSCH resources; and
in accordance with a determination that the second device is in the inactive mode and there is transmission to be transmitted from the second device to the first device:
determining a target transmission occasion from the transmission occasions according to the first configuration, the target transmission occasion corresponding to more than one candidate beam;
performing, at the target transmission occasion, the transmission from the second device to the first device; and
transmitting at the target transmission occasion an indication of a target beam selected from the more than one candidate beam.

20. The method of claim 19, wherein the correspondence between the candidate beams and a plurality of transmission occasions indicates that different candidate beams are corresponding to different subsets of the plurality of transmission occasions.

* * * * *